United States Patent
C et al.

(10) Patent No.: US 10,319,116 B1
(45) Date of Patent: Jun. 11, 2019

(54) DYNAMIC COLOR ADJUSTMENT OF ELECTRONIC CONTENT

(71) Applicant: Amazon Technologies, Inc., Seattle, WA (US)

(72) Inventors: Prannoy Vargis C, Kottayam (IN); James Joseph Poulin, Seattle, WA (US); Deepak Manohar, Chennai (IN); Chad Siegel, Seattle, WA (US); Adam Schott Riggs, Bainbridge Island, WA (US); Surendran Rangasamy, Udumalpet (IN); Joseph King, Seattle, WA (US); Michael Patrick Bacus, Seattle, WA (US); Eric Allen Menninga, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 495 days.

(21) Appl. No.: 14/619,688

(22) Filed: Feb. 11, 2015

Related U.S. Application Data

(60) Provisional application No. 62/086,616, filed on Dec. 2, 2014.

(51) Int. Cl.
| | | |
|---|---|---|
| *G09G 5/02* | (2006.01) | |
| *G06T 11/00* | (2006.01) | |
| *G06F 3/0482* | (2013.01) | |
| *G06F 11/00* | (2006.01) | |

(52) U.S. Cl.
CPC .......... *G06T 11/001* (2013.01); *G06F 3/0482* (2013.01); *G09G 5/02* (2013.01); *G09G 2320/066* (2013.01)

(58) Field of Classification Search
None
See application file for complete search history.

(56) References Cited

U.S. PATENT DOCUMENTS

| | | | | |
|---|---|---|---|---|
| 6,425,650 | B1 * | 7/2002 | Walker | B41J 2/125 347/14 |
| 2002/0113801 | A1 * | 8/2002 | Reavy | G09G 5/02 345/589 |
| 2002/0169805 | A1 * | 11/2002 | Edge | G06Q 10/10 715/275 |
| 2002/0186222 | A1 * | 12/2002 | Morton | G06F 9/451 345/589 |

(Continued)

*Primary Examiner* — Aaron M Richer
(74) *Attorney, Agent, or Firm* — Eversheds Sutherland (US) LLP

(57) ABSTRACT

Systems, methods, and computer-readable media are disclosed for dynamic color adjustment of electronic content. In one embodiment, a system may determine a first background color corresponding to a color theme for use in presentation of electronic content, the color theme further specifying a first text color for displaying text. The system may convert the first text color to hue-saturation-value (HSV) color space, and modify a brightness component of the first text color to generate a second text color. The system may determine a first contrast ratio between the second text color and the first background color, and determine that the first contrast ratio satisfies a first threshold contrast ratio. The system may display the electronic content using the first background color, the electronic content including text having the second text color.

19 Claims, 7 Drawing Sheets

(56) References Cited

U.S. PATENT DOCUMENTS

2007/0257937 A1* 11/2007 Rye .................. G06T 11/00
　　　　　　　　　　　　　　　　　　　345/617
2011/0074807 A1* 3/2011 Inada ................ G06T 11/001
　　　　　　　　　　　　　　　　　　　345/589

* cited by examiner

DYNAMIC COLOR ADJUSTMENT OF ELECTRONIC CONTENT

RELATED APPLICATION

This patent application claims the benefit of U.S. Provisional Patent Application No. 62/086,616, filed Dec. 2, 2014, and titled "DYNAMIC COLOR ADJUSTMENT OF ELECTRONIC CONTENT", which is hereby incorporated by reference in its entirety.

BACKGROUND

The number of people consuming digital or electronic content continues to grow, spurred on by the increasing breadth of content available in digital form and the continual improvements in data transmission speeds and device portability. For example, an increasing number of people now consume electronic books ("eBooks") in lieu of or in addition to traditional print equivalents. Electronic content, such as eBooks, may include colored text, images, or the like. Electronic content may also include specific colors or color themes that may convey information, such as red colored text to emphasize a portion of the electronic content. The specific colors or color themes may be affected by a user selected color theme, such as a dark color theme configured to facilitate consumption of electronic content in a relatively dark environment. Such user selected color themes may affect the user experience of the electronic content.

Figure 1:
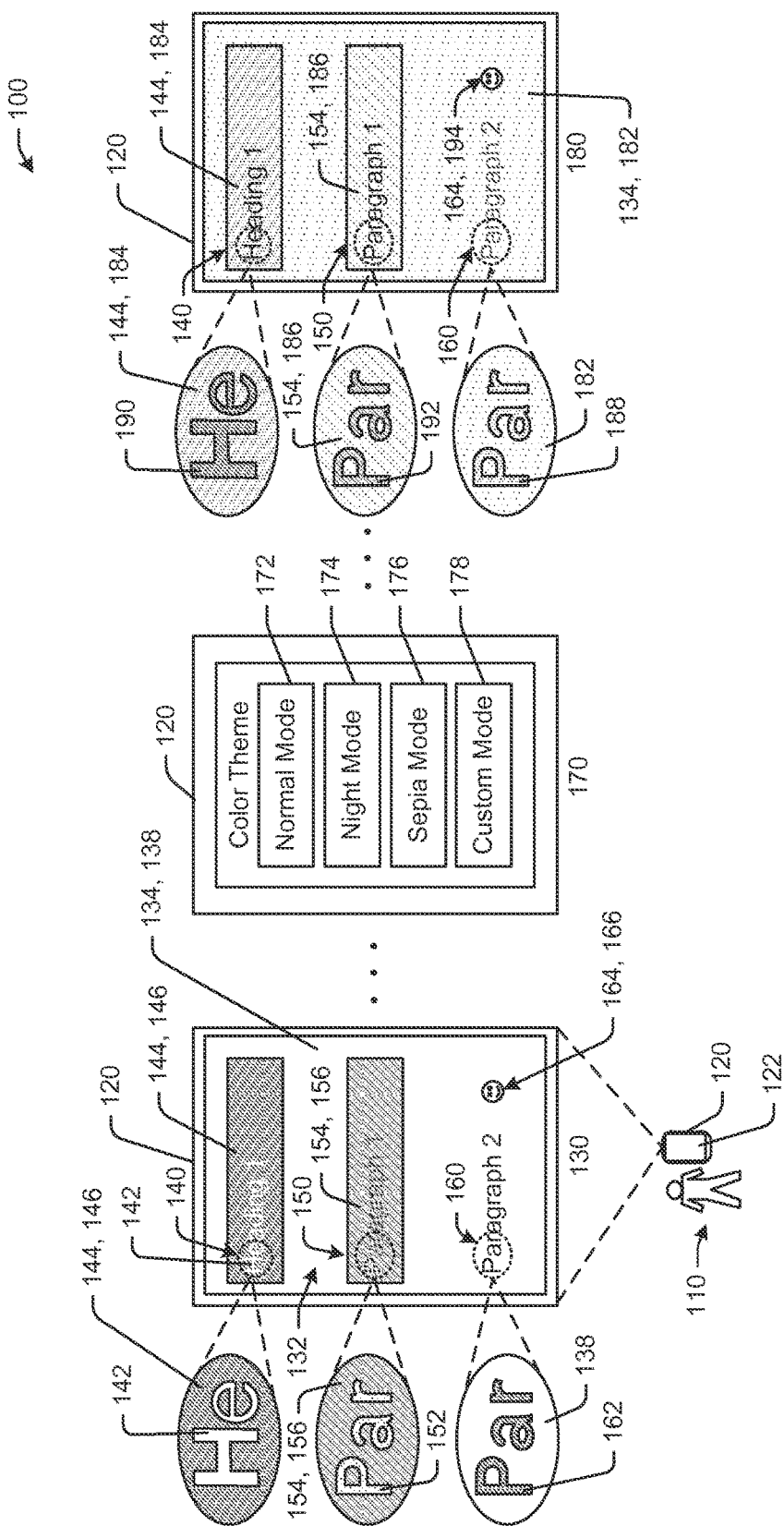
FIG. 1 is a schematic diagram of an example system in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for dynamic color adjustment of electronic content such as an electronic book ("eBook"). Electronic content may include any type of digital content capable of being consumed, including, without limitation, eBooks, electronic publications, digital magazines and newspapers, Internet content, or the like. Electronic content may include text content, graphical content, or the like, and may include information that is digitally broadcast, streamed, or contained in computer files. While example embodiments of the disclosure may be described in the context of eBooks, it should be appreciated that the disclosure is more broadly applicable to any form of digital or electronic content.

Color may be used by authors and/or publishers to convey information to readers or consumers of electronic content. For example, an author may emphasize a portion of text by using a red text color on a white media background or a white text background (e.g., a red highlighted text background). In another example, an author may highlight white text with a yellow text background to indicate that the text may important. In an additional example, an author or publisher may designate or use a text background color that is different than a default background color to provide a highlighting effect or to otherwise emphasize portions of text. In some environments, users may encounter difficulty consuming content with colors selected by the author or publisher. For example, if an author has designated bright red text on a white background, and the user is in a relatively dark environment, the user may feel that the color of the text and/or white media background is too bright. Accordingly, the user may adjust an operational mode of a mobile device, for example a tablet, to a different operational mode such as a "night" mode to facilitate viewing the text on the mobile device, replacing the white media background with a black media background. In this case, the red text may no longer be as legible or convey the contrast that it did on the original white background color.

Example embodiments of the disclosure relate to systems, methods, computer-readable media, techniques, and methodologies for dynamically adjusting colors selected by authors or publishers of electronic content across different operational modes of a mobile device, such that versions of originally selected colors are maintained in each operational mode, and some or all information conveyed via the use of color is available to users in each operational mode of the mobile device.

Referring to FIG. 1, an overview of an example environment 100 is depicted in accordance with one or more embodiments of the disclosure. In the environment 100, a user 110 can operate a mobile device 120. The mobile device 120 may be operated by the user 110 to consume electronic content, such as an eBook. The mobile device 120 may be in wired or wireless communication with one or more remote servers from which electronic content may be retrieved for consumption. In some embodiments, the mobile device 120 may have electronic content, such as one or more eBooks, stored locally on one or more memory device(s). In certain embodiments, the mobile device 120 may be configured to render portions of an eBook on a display 122 of the mobile device 120 by executing one or more modules stored on the memory of the mobile device 120 with one or more processors.

eBooks may include eBook presentation information, such as color information and font information. Color information may include information related to text color, text background color, background color selections, and/or color themes. Font information may include information related to size and/or type of font. eBooks may include other eBook presentation information relating to presentation of portions of the eBook on the display 122 of the mobile device 120. The eBook presentation information may include author or publisher selected color selections, such as text colors indicated by text color code values, text background colors indicated by text background color code values, and/or background colors indicated by background color code values.

The user 110 may encounter difficulty consuming content with colors selected by the author or publisher. For example, if an author has designated bright red text on a white background, and the user 110 is in a relatively dark environment, the user 110 may feel that the color of the text and/or background is too bright. Accordingly, the user 110 may adjust an operational mode, such as switching to a night mode, of the mobile device 120. In the night mode, the author or publisher selected white background may be changed to a black background, for example, and the text color may be changed from the author or publisher selected bright red text color to a white text color, in order to facilitate consumption of the eBook in the dark environment. In changing operational modes of the mobile device 120, author or publisher selected color information may be overridden, thereby removing or otherwise ignoring the originally intended color selections of the author or publisher, and negating any information the author or publisher intended to convey via the use of specific colors. In certain embodiments of the disclosure, the systems, methods, computer-readable media, techniques, and methodologies described herein may preserve the author or publisher's original intent by retaining author or publisher color information across any number of operational modes of the mobile device 120.

Referring now to a first screen 130 on the display 122 of the mobile device 120 in FIG. 1, a portion of an eBook may be presented to the user 110. The portion of the eBook may include text 132 and/or images presented with a background 134. The eBook may include color information, such as color code values indicative of author or publisher selected colors, for the rendered portion of the eBook. In the illustrated embodiment, the background 134 may have a background color 138 of white, indicated by or otherwise associated with a background color code value. Portions of the text 132 may have text background colors that are different than the background color 138. For example, a first portion 140 of the text 132 may have a first text color 142 of white, indicated by or otherwise associated with a first text color code value. The first portion 140 may also include a first text background 144 with a first text background color 146 of black, indicated by or otherwise associated with a first text background color code. Although the text color 142 of the first portion 140 is white and the background color 138 is white, the first portion 140 of the text 132 is visible because of the contrast with the black first text background 144.

A second portion 150 of the text 132 may have a second text color 152 of dark blue, indicated by or otherwise associated with a second text color code value. The second portion 150 of the text 132 may include a second text background 154 with a second text background color 156 of pink, indicated by or otherwise associated with a second text background color code. A third portion 160 of the text 132 may have a third text color 162 of black, indicated by or otherwise associated with a third text color code value. The third text color 162 may be the same as the first text background color of black 146. The third portion 160 of the text 132 may include an image, such as a smiley face line art monochrome image 164 with an image color 166 of bright yellow indicated by or otherwise associated with an image color code value.

The mobile device 120 may be in a normal operational mode when the first screen 130 is presented. The user 110 may move the mobile device 120 to another location and/or otherwise desire to change the operational mode of the mobile device 120. Referring to a second screen 170 presented to the user 110 on the display 122 of the mobile device 120, the user 110 may select from any number of operational modes of the mobile device 120. Each operational mode may be associated with different color selections, color themes, and/or other presentation related options for electronic content presented on the mobile device 120. For example, the user 110 may be presented with a first selectable option 172 for a "normal mode," a second selectable option 174 for a "night mode," a third selectable option 176 for a "sepia mode," and a fourth selectable option 178 for a "custom mode." In certain embodiments of the disclosure, normal mode may be associated with default color settings, such as black text with white background, and may incorporate author or publisher selected colors. Night mode may be associated with a theme background color of black and a text color of white, and may also incorporate author or publisher selected colors. Sepia mode may be associated with a theme background color of sepia and a text color of tan, for example, as may also incorporate author or publisher selected colors. Custom mode may allow the user 110 to select custom presentation settings, such as custom text colors, text background colors, theme background colors, and/or other colors. Each operational mode may be associated with author or publisher selected colors. The author or publisher selected colors for specific portions of the electronic content may be maintained across each operational mode, while text or content indicated as having default color may be changed to any number of colors corresponding to the selected operational mode. Other operational modes may be available in other embodiments.

In each operational mode, a brightness level of author or publisher selected colors may be adjusted to correspond to the selected operational mode. For example, if the user 110 selects night mode, which may be configured to facilitate consumption of content in a relatively dark environment, brightness levels of author or publisher selected colors may be reduced or increased relative to the normal mode, for example. Brightness levels of author or publisher selected colors may be adjusted such that a minimum contrast ratio is achieved between the author or publisher selected color and the immediate background, thereby maintaining readability across all operational modes of the mobile device 120. Accordingly, versions of the author or publisher selected colors indicative of the author or publisher's original selections may be preserved across all operational modes, and the intent of the author or publisher to select one or more colors can be maintained.

At the second screen 170, the user 110 may select the third selectable option 176 for sepia mode. The mobile device 120 may switch to the sepia mode operational mode, and may present the portion of the eBook in sepia mode, as shown at a third screen 180. The mobile device 120 may determine theme-specific versions of the original colors, or in some instances different colors, for presentation in the sepia operational mode. For example, the third screen 180, the presented portion of the eBook may have different colors or different versions of colors than the first screen 130. For example, the background 134 may be changed from the white background color 138 to a sepia background color 182.

The mobile device 120 may determine blended text background colors that correspond to the selected operational mode by implementing an alpha blending process. For example, the first text background color 146 of the first text background 144 may be blended with the sepia background color 182 of the background 134 to form a third text background color 184. The second text background color 156 of the second text background 154 may be blended with the sepia background color 182 of the background 134 to form a fourth text background color 186. The blended text background colors generated by the mobile device 120 may be adjusted such that the blended text background colors satisfy a predetermined threshold contrast ratio with respect to the background color. For example, the threshold contrast ratio between the blended text background color and the background color may be at least 2:1, which may mean that the blended text background color has a relative luminance twice that of the background color. In some embodiments, the first and second text background colors 146, 156 may be blended with the sepia background color 182 via alpha blending.

Alpha blending may include blending a foreground color with a background color while considering a translucency of the foreground color, thereby producing a blended color. In certain embodiments, alpha blending may be implemented with a hard coded opacity value of 0.75 for the background color, and/or an opacity value of 0.25 for the foreground color. For example, color code values, as described herein, may include an alpha channel value ranging from 0 to 1. The alpha channel value may be indicative of the translucency of the color, where 0 is fully transparent and 1 is fully opaque. In instances where the foreground color is fully transparent, the resultant blended color may be the background color. In instances where the foreground color is fully opaque, the resultant background color may be the foreground color. In instances where the foreground color has a translucency between 0 and 1 as indicated by the alpha channel value, the resultant blended color may be a weighted average of the foreground and background colors, based at least in part on the transparency of the foreground color. The weighted average may be determined by the alpha blending process with opacity values of the background and foreground colors equaling a sum of 1, where a weight or opacity value of the background color is represented as a decimal between 0 and 1 and a weight or opacity value of the foreground color is represented as a decimal between 0 and 1, such that the combined opacity values equal 1. For example, a red background color may have an opacity value of 0.5 and a white foreground color may have an opacity value of 0.5. As a result, the resulting blended color will have a weighted average of 50% of the red color and 50% of the white color. In some instances, hard coded opacity values may be used. Pre-multiplication techniques may be implemented to reduce processing time in performing alpha blending calculations.

The third text background color 184 may be an alpha blend of the black first text background color and the sepia background color. The mobile device 120 may alpha blend the foreground color, in this case the black first text background color 146, with the background color, in this case the sepia background color 182, to generate the blended third text background color 184, based at least in part on a translucency or opacity value of the black first text background color 146, which may be indicated by an alpha channel or opacity value as part of the first text background color code. The resultant color may be, for example, a dark brown third text background color.

The fourth text background color 186 may be an alpha blend of the pink second text background color and the sepia background color. The mobile device 120 may alpha blend the foreground color, in this case the pink second text background color 156, with the background color, in this case the sepia background color 182, to generate the blended fourth text background color 186, based at least in part on a translucency value of the pink second text background color 156, which may be indicated by an alpha channel value as part of the first text background color code. The resultant color may be, for example, a dark purple fourth text background color.

The mobile device 120 may determine a different version (e.g., lighter or darker) of the original text colors that correspond to the selected operational mode. For example, because the third portion 160 of the text 132 in FIG. 1 has a default background color, or does not have a different text background color than the theme background color, the immediate background of the third portion 160 is the default background 134, and the background color of the third portion 160 is the sepia background color 182.

To determine a version of the third text color 162 of the third portion 160 to present, the mobile device 120 may determine that the original third text color 162 is black, and that the background color in the current operational mode is the sepia background color 182. The mobile device 120 may determine that the third text color 162 is darker than the sepia background color 182, for example by comparing a portion of, or the entire, color code value of the third text color 162 to the sepia background color 182.

The mobile device 120 may convert the third text color 162 from a red-green-blue (RGB) color space to a hue-saturation-value (HSV) color space. The RGB color space is any additive color space defined by the three chromaticities of red, green, and blue additive primaries, and can produce any chromaticity defined by red, green, and blue primary colors. Chromaticity may be an objective specification of the quality of a color regardless of its luminance. The HSV color space, or hue-saturation-lightness (HSL) color space, is a cylindrical coordinate representation of points in a RGB color model. A hue component may be indicative of the degree to which a stimulus can be described as similar to or different from stimuli that are described as red, green, blue, and yellow, and may be indicated by a hue value. A saturation component may be indicative of the colorfulness of a stimulus relative to its own brightness, and may be indicated by a saturation value. A value component or brightness component may be indicative of lightness, or perceived luminance in relation to the saturation, or brightness relative to the brightness of a similarly illuminated white, and may be indicated by a value of the value.

In one example, the third text color 162 may be converted from the RGB color space to the HSV color space using a suitable algorithm, such as an iterative process. Upon converting the third text color 162 to the HSV color space, the mobile device 120 may begin an iterative process of adjusting a "value" component of the HSV color space for the third text color 162 until a predetermined threshold contrast ratio is achieved. The predetermined contrast ratio may be selected such that text is legible when viewed against its immediate background. The value component may be representative of a lightness of the third text color 162.

The iterative process of adjusting the value component may include, for example, incrementally increasing or decreasing a value of the value component by a predetermined increment amount. The mobile device 120 may continue the iterative process until the predetermined threshold contrast ratio between the modified third text color and the immediate background color, in this instance the sepia background color 182, is achieved, thereby maintaining readability as well as the author or publisher's intent. In some instances, the predetermined threshold contrast ratio may be equal to or about 4.5:1. In other instances, the predetermined threshold contrast ratio may be a range with upper and lower limits, such as about 5:1 and 4:1. In this example embodiment, the mobile device may determine that the original third text color 162 is darker than the sepia background color 182. Based at least in part on this determination, the mobile device may begin incrementally decreasing the initial value of the value component, such that the brightness of the original third text color 162 is decreased. After each incremental increase in the value of the value component, the mobile device 120 may determine a contrast ratio between the current iteration of the third text color and the sepia background color 182. In one example, the contrast ratio may be determined by comparing or otherwise analyzing a relative luminance of the third text color and the sepia background color 182.

The iterative process may be used to produce a resultant text color that satisfies a predetermined threshold contrast ratio between the text color and an immediate background of the text (e.g., a text background color, or the general background color), which may facilitate ease of reading for users. In embodiments where the background color is a solid color, for example black or white, then the relative luminance of the text can be maintained by making sure that each of the text letters has, for example, at least a 4.5:1 contrast ratio with the background. In instances where the background or the letters forming the text vary in relative luminance, or are patterned, then the background around the letters can be adjusted so that the letters maintain at least a 4.5:1 contrast ratio with the background behind them, although the letters do not have a 4.5:1 contrast ratio with the entire background. For example, if a letter is lighter at the top than it is at the bottom, it may be difficult to maintain the contrast ratio between the letter and the background over the entire height or width of letter. In such instances, the mobile device 120 may darken the background behind the letter, or add a thin black outline, for example at least one pixel wide, around the letter in order to keep the contrast ratio between the letter and the background at least 4.5:1. The contrast ratio may be maintained in some embodiments by adjusting the relative luminance of the text as the relative luminance of the background changes across a rendered portion of electronic content. In one example, the mobile device 120 may calculate a contrast ratio by measuring a first relative luminance of each letter of a text (unless the text is uniform) using a formula, measuring a second relative luminance of the background pixels immediately next to the letter using the same formula or a different formula, and calculating the contrast ratio between the first relative luminance and the second relative luminance. Relative luminance may be determined in color spaces from linear RGB components, in one example. For RGB color spaces, relative luminance may be equal to [0.2126 R+0.7152 G+0.0722 B].

Upon determining that the predetermined threshold contrast ratio is met or exceeded, the mobile device 120 may convert the modified third text color from the HSV color space to the original color space, or in this embodiment, the RGB color space. The mobile device 120 may present a modified third text color 188 that is less bright than the original third text color 162, as illustrated at the third screen 180. For example, the modified third text color 188 may appear as a less bright black (e.g., dark brown) instead of the original black third text color 182, which may facilitate consumption of the content in sepia operational mode. Accordingly, since the modified third text color 188 is either a lighter or darker version of the original third text color 162, the author or publisher's selected color is still presented.

The first portion 140 of the text 132 in the embodiment of FIG. 1 is presented with the third text background color 184 as the immediate background. The mobile device 120 may perform the same iterative process described with respect to the third portion 160 of the text 132 to generate a modified first text color 190 for presentation in sepia mode. For example, the mobile device 120 may determine that the original first text color 142 of white is lighter than the third text background color 184 (which is the blend of the first text background color 144 and the sepia background color 182). Based at least in part on this determination, the mobile device 120 may begin incrementally increasing the initial value of the value component of the original first text color 142, such that the brightness of the original first text color 142 is increased. After each incremental increase in the value of the value component, the mobile device 120 may determine a contrast ratio between a current iteration of the first text color and the third text background color 184. Upon reaching a maximum value of the value component, the mobile device 120 may determine that the predetermined threshold contrast ratio is not met, and may begin incrementally decreasing (from the initial value) the value component to determine if the predetermined threshold contrast ratio can be met. For example, since the original first text color 142 was white, the mobile device 120 may determine that the first text color may need to be less bright in order to meet the predetermined threshold contrast ratio. Upon determining that the predetermined threshold contrast ratio is met, the mobile device 120 may convert the modified first text color from the HSV color space to the RGB color space. The mobile device 120 may present a modified first text color 190 that is less bright than the original first text color 142, as illustrated at the third screen 180. For example, the modified first text color 190 may appear as a less bright white instead of the original white first text color 142, which may facilitate consumption of the content in sepia operational mode. Accordingly, since the modified first text color 190 is either a lighter or darker version of the first text color 142, the author or publisher's selected color is still presented.

The second portion 150 of the text 132 in the embodiment of FIG. 1 is presented with the fourth text background color 186 as the immediate background. The mobile device 120 may perform the same iterative process described with respect to the first portion 140 and the third portion 160 of the text 132 to generate a modified second text color 192 for presentation in sepia mode. For example, the mobile device 120 may determine that the original second text color 152 of dark blue is darker than the fourth text background color 186 (which is the blend of the second text background color 154 and the sepia background color 182). Based at least in part on this determination, the mobile device may begin incrementally decreasing the initial value of the value component of the original second text color 152, such that the brightness of the original second text color 152 is decreased. After each incremental decrease in the value of the value component, the mobile device 120 may determine a contrast ratio between a current iteration of the second text color and the fourth text background color 186. Upon determining that the predetermined threshold contrast ratio is met, the mobile device 120 may convert the modified second text color from the HSV color space to the RGB color space. The mobile device 120 may present a modified second text color 192 that is brighter than the original second text color 152, as illustrated at the third screen 180. For example, the modified second text color 192 may appear as a brighter blue instead of the original dark blue second text color 152, which may facilitate consumption of the content in sepia operational mode. Accordingly, since the modified second text color 192 is either a lighter or darker version of the original second text color 152, the author or publisher's selected color is still presented.

The mobile device 120 may perform the iterative process for images rendered on the display 122 of the mobile device. For example, the smiley face image 164 may be bright yellow. The mobile device 120 may determine that the image color 166 of bright yellow is brighter than the sepia background color 182. Based at least in part on this determination, the mobile device may begin incrementally increasing the initial value of the value component of the image color 166, such that the brightness of the image color 166 is increased. After each incremental increase in the value of the value component, the mobile device 120 may determine a contrast ratio between a current iteration of the image color and the sepia background color 182. Upon determining that the predetermined threshold contrast ratio is met, the mobile device 120 may convert the modified image color from the HSV color space to the RGB color space. The mobile device 120 may present a modified image color 194 that is brighter than the original image color 166. For example, the modified image color 194 may appear as a lighter yellow instead of the original yellow image color 166, which may facilitate consumption of the content in sepia operational mode. Accordingly, since the modified image color 194 is a lighter or darker version of the original image color 166, the author or publisher's selected color is still presented. Other examples include any non-text objects rendered as monochrome images, bitmap images, Gaiji/Kanji characters, highlight colors, and/or vector based images.

Accordingly, the systems, methods, computer-readable media, techniques, and methodologies described herein may preserve an author or publisher's original color selections when a user changes an operational mode of the mobile device on which electronic content is presented. Although discussed herein in the context of eBooks, the systems, methods, and apparatuses of the disclosure may be applicable to other forms of electronic content, such as videos, webpages, and other forms of electronic content described herein.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

The techniques are described below with reference to the following devices and processes. However, it is to be appreciated that a number of other devices may also employ these techniques. Furthermore, as used herein, the terms "book," "electronic book" or "eBook" may include any type of content which can be stored and distributed in digital form. By way of illustration, and without limitation, electronic books can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, images, and the like. Further, as used herein, the terms "book," "electronic book" or "eBook" are not limited to the entirety of any item and may be a page, a chapter, a section, a set of pages and so on within a textual electronic content item. Similarly, the term "eBook," when used in the context of non-textual items, is not limited to the entirely or any particular portion of any item.

Example embodiments of the disclosure can provide a number of features and/or technical effects. For example, in accordance with example embodiments of the disclosure, the dynamic color adjustment for electronic content described herein may facilitate conveyance of information related to author or publisher selected colors across different operational modes of mobile devices. It should be appreciated that the above examples of features and/or technical effects of example embodiments of the disclosure are merely illustrative and not exhaustive. The systems, methods, computer-readable media, techniques, and methodologies described herein may be configurable to provide optimal contrast ratios of text to immediate background for different forms of color blindness.

While FIG. 1 illustrates one example system for implementing the disclosed techniques, it is to be appreciated that multiple other devices and architectures may implement the described techniques. Moreover, the operations described above for the system shown in FIG. 1 are not limiting and many variations and/or additional functions of the described system are contemplated within the scope of this disclosure.

Illustrative Processes and Use Case

Figure 2:
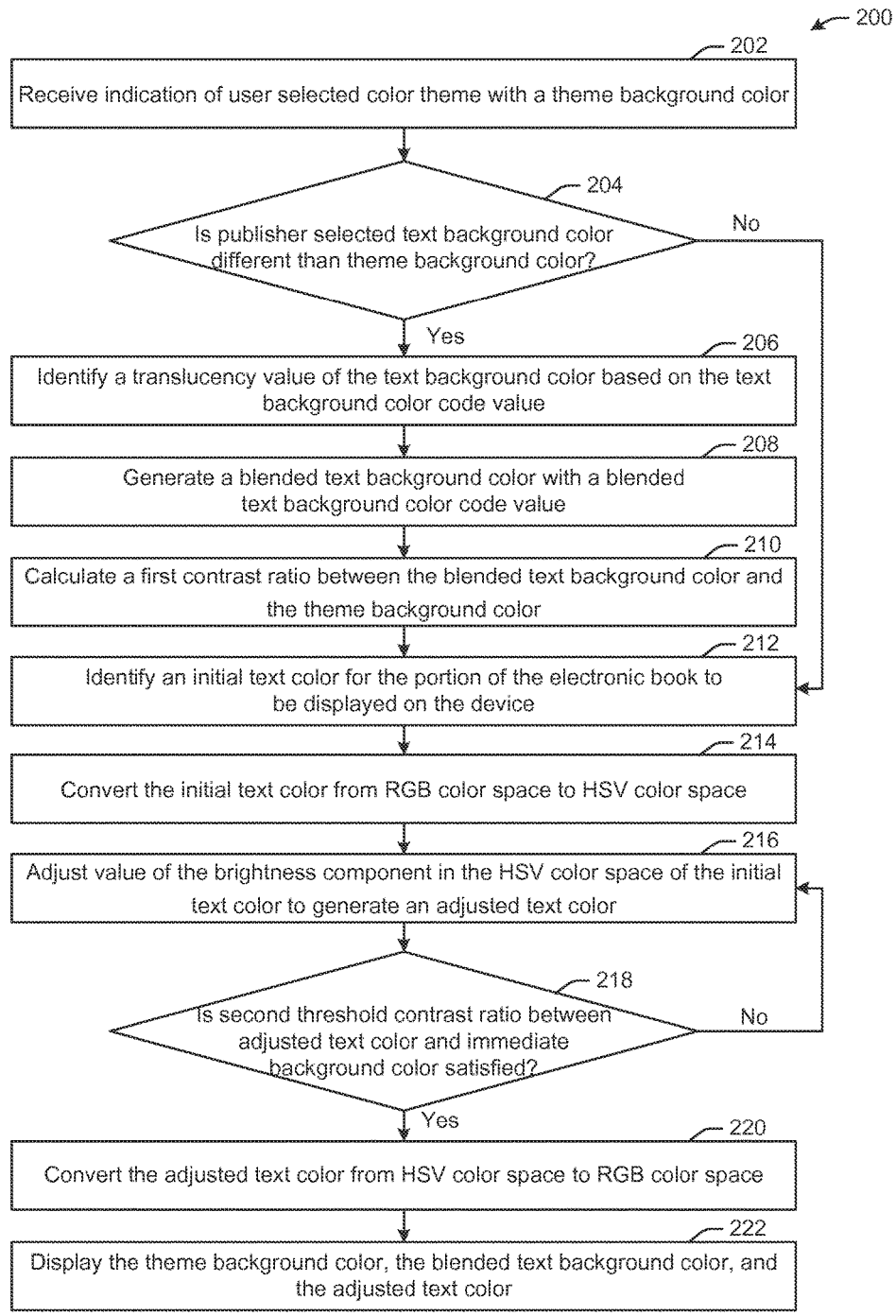
FIG. 2 is an illustrative process flow for dynamic color adjustment of electronic content in accordance with one or more example embodiments of the disclosure.
Figure 3:
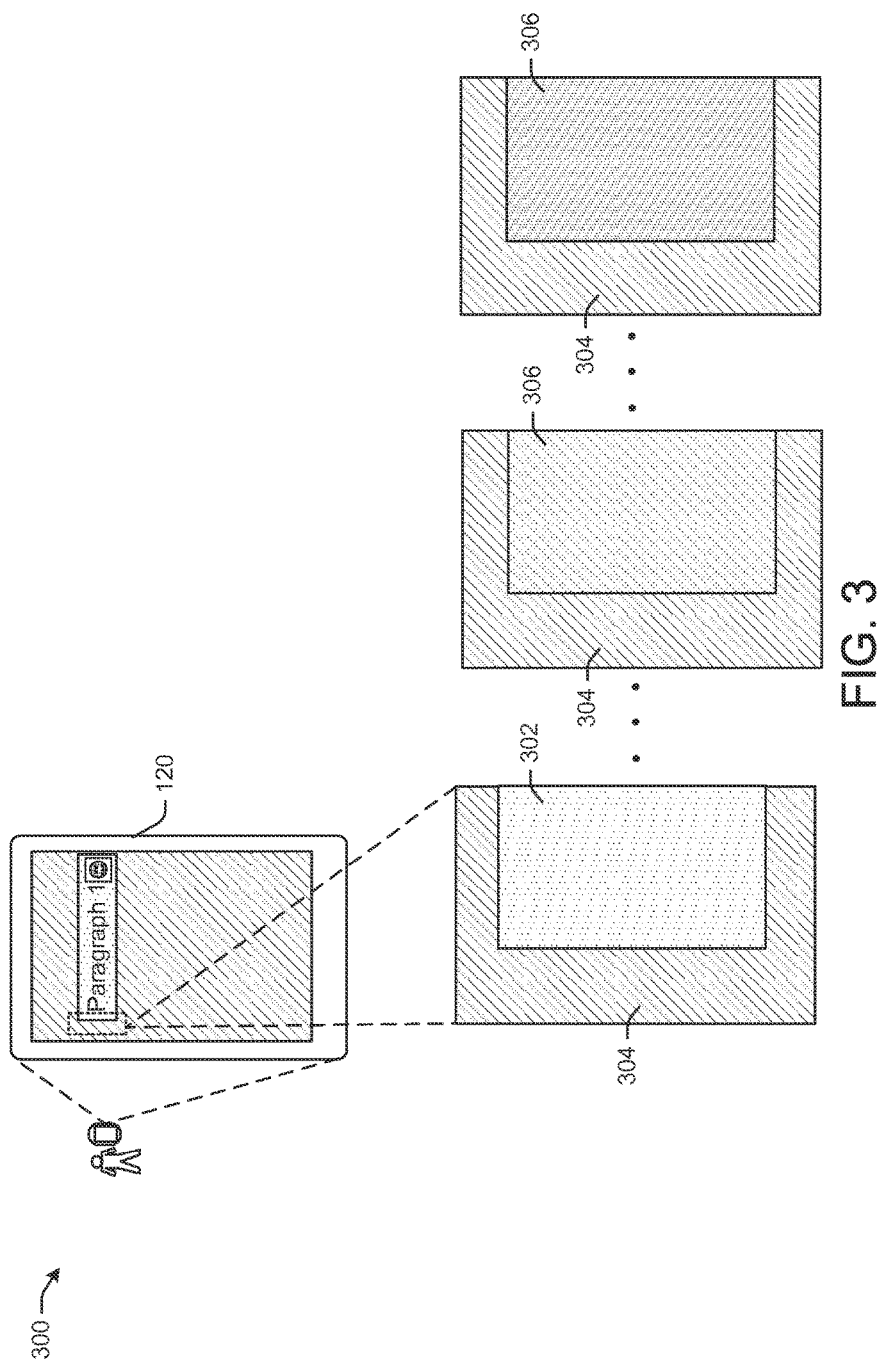
FIGS. 3-5 schematically illustrate an example use case in accordance with one or more embodiments of the disclosure.

FIG. 2 depicts an illustrative process 200 for dynamic adjustment of color for electronic content in accordance with one or more embodiments of the disclosure, and will be discussed in conjunction with the schematic illustrations of FIGS. 3-5. In example embodiments, the process 200 may be performed to adjust author or publisher color selections for electronic content across different operational modes of a mobile device. While the operations of process 200 may be described in the illustrative context of an eBook, it should be appreciated that the process 200 is more broadly applicable to other types of electronic content. The process 200 may be performed, in one example, by the mobile device 120 of FIG. 1.

An eBook may be scanned to determine whether an author or publisher has selected any non-default or specific colors or color schemes, such as background colors, text background colors, and/or text colors. In some embodiments, the mobile device 120 may determine that some or all of the eBook contains author or publisher selected color information. In certain instances, a user, such as 110, of the mobile device 120 may change an operational mode of the mobile device 120, which may in turn implement or otherwise access user, author, or publisher selected color information.

At block 202 of the process 200, the mobile device 120, which may be an electronic reader device comprising one or more processors, may receive a user selected theme background color. The theme background color may have a theme background color code value indicative of the theme background color. For example, a red theme background color may be indicated by a theme background color code value of rgb(255,0,0), or rgb(255,0,0,0), or #FF0000, or #F00. In another example, a black theme background color may be indicated by a theme background color code value of rgb(0,0,0), or #000000, or #000. The theme background color may be associated with one or more operational modes of the mobile device 120. For example, user selectable color themes or color settings may include a black background setting, a sepia background setting, a green background setting, or a traditional white background setting. Referring to FIG. 3, a user 300 may select a night mode as an operational mode for the mobile device 120. The night mode may include a black background and white text as default settings.

At decision block 204, the mobile device 120 may identify, by the one or more processors, a publisher selected text background color for a portion of electronic content, such as an electronic book, to be displayed on the mobile device 120. The text background color may have a text background color code value indicative of the text background color. For example, referring to FIG. 3, the mobile device 120 may identify a text background color 302 of yellow.

The mobile device 120 may compare the text background color code value to the theme background color code value. By comparing the text background color code value to the theme background color code value, the mobile device 120 may determine whether the text background color is different than the theme background color. If the mobile device 120 determines that the text background color is the same as the theme background color, or that there is no special text background color, the mobile device 120 may proceed to block 212 of the process 200. In FIG. 3, the mobile device 120 may compare the text background color code value indicating the yellow text background color 302 to the theme background color code value indicating a black theme background color 304. The mobile device 120 may determine that the yellow text background color is different than the black theme background color 304.

Upon determining that the text background color is different than the theme background color, at block 206, the mobile device 120 may identify a translucency value of the text background color based at least in part on the text background color code value. For example, in FIG. 3, the mobile device 120 may identify a translucency or opacity value of the yellow text background color 302 to be 0.5 by determining that the yellow text background color has a color code value of rgb(233,235,0,0.78), where the translucency or opacity is identified as 0.78 from the color code value.

At block 208, the mobile device 120 may generate a blended text background color with a blended text background color code value indicative of the blended text background color. The blended text background color code value may be a weighted average of the theme background color code value and the text background color code value adjusted by the translucency value. In FIG. 3, the mobile device 120 may generate a blended text background color 306 that is a blend of the yellow text background color 302 and the black background color 304. The resultant blended text background color 306 may be darker than the yellow text background color 302 and lighter than the black background color 304, such as a darker yellow color, for example.

At block 210 of the process 200, the mobile device 120 may calculate a first contrast ratio between the blended text background color and the theme background color. In FIG. 3, for example, the mobile device 120 may calculate a first contrast ratio between the blended text background color 306 and the black background color 304. The mobile device 120 may determine that the first contrast ratio satisfies a first threshold contrast ratio. For example, the first threshold contrast ratio may be at least 2:1, or may be a range from about 1.5:1 to about 2.5:1. If the first threshold contrast ratio is not met, the mobile device may return to block 210 and incrementally adjust a value of the value component of the blended text background color by a predetermined increment, such as +/−0.05, until the first threshold contrast ratio is satisfied.

Upon determining that the first threshold contrast ratio is satisfied, at block 212 the mobile device 120 may identify an initial text color for the portion of the electronic content to be displayed on the device, the initial text color having an initial text color code value indicative of the initial text color. For example, referring to FIG. 4, the mobile device 120 may identify an initial text color 308 of red for a portion of the eBook to be displayed on the mobile device 120.

At block 214, the mobile device 120 may convert the initial text color from red-green-blue (RGB) color space to hue-saturation-value (HSV) color space comprising a hue component, a saturation component, and a value component.

At block 216, the mobile device 120 may adjust an initial value of the value component of the initial text color to generate an adjusted text color, such that a second contrast ratio between the adjusted text color and the blended text background color satisfies a second threshold contrast ratio. At decision block 218, the mobile device 120 may determine whether a second threshold contrast ratio between the adjusted text color and the immediate background color is satisfied. For example, the mobile device 120 may adjust the initial value of the value component in 0.05 increments, or 0.5 increments. The second threshold contrast ratio may be, for example, 4.5:1, or a range, for example from about 4:1 to about 5:1. If the second threshold contrast ratio is satisfied, the mobile device 120 may proceed to block 220, and if not, the mobile device 120 may return to block 216 and re-adjust the value of the value component.

Adjusting the initial value of the value component of the initial text color to generate the adjusted text color may include determining, by the one or more processors of the mobile device 120, that the initial text color is either lighter or darker than the blended text background color. Based at least on the determination of whether the initial text color is lighter or darker than the blended text background color, the mobile device 120 may increase or decrease the initial value of the value component of the initial text color by a first amount. For example, if the initial text color is lighter than the blended text background color, the initial value may be incrementally increased, or if the initial text color is darker than the blended text background color, the initial value may be incrementally decreased. The mobile device 120 may continue the iterative process until the second threshold contrast ratio is satisfied. If the second threshold contrast ratio is not satisfied, the mobile device 120 may continue increasing or decreasing the initial value of the value component of the initial text color, until the mobile device 120 determines that the second contrast ratio satisfies the second threshold contrast ratio. In some embodiments, the systems, methods, computer-readable media, techniques, and methodologies described herein may adjust only a brightness component, such as a value of the value component, while leaving the hue value and the saturation value at their respective initial settings, thereby preserving portions of the author or publisher selected color settings or selections.

In some instances, the mobile device 120 may determine that the value component has been increased to a maximum value, but the second threshold contrast ratio is not satisfied. Upon increasing to a maximum value and not satisfying the second threshold contrast ratio, the mobile device 120 may begin incrementally decreasing the value component until either a minimum value is reached or the second threshold contrast ratio is satisfied. In some instances, instead of incrementally decreasing from the maximum value, the mobile device 120 may begin incrementally decreasing from the initial value. In some embodiments, text that was lighter than the immediate background in the original electronic content will remain lighter than its immediate background in different operational modes, while text that was darker than the immediate background in the original electronic content will remain darker than its immediate background in the different operational mode.

In the opposite instance, the mobile device 120 may determine that the value component has been decreased to a minimum value, but the second threshold contrast ratio is not satisfied. Upon decreasing to a minimum value and not satisfying the second threshold contrast ratio, the mobile device 120 may begin incrementally increasing the value component until either a maximum value is reached or the second threshold contrast ratio is satisfied. In some instances, instead of incrementally increasing from the minimum value, the mobile device 120 may begin incrementally increasing from the initial value.

Figure 4:
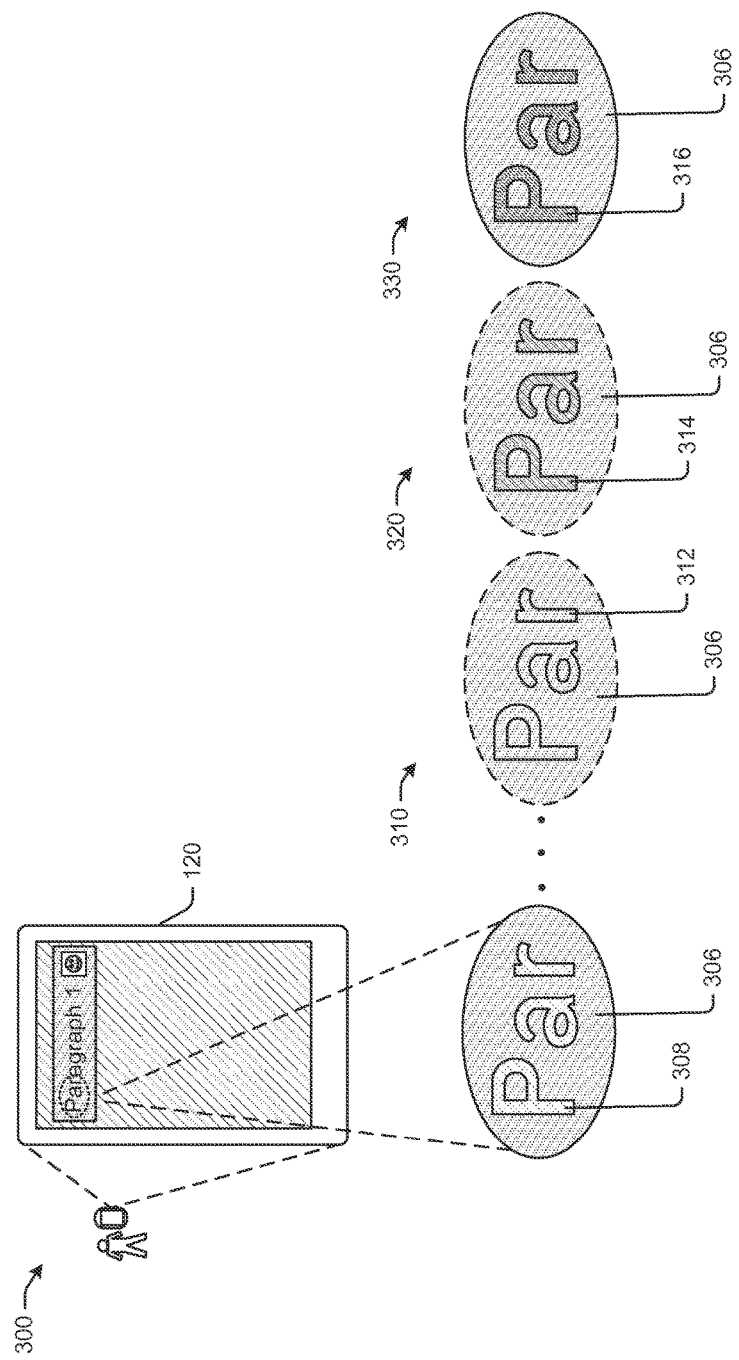

In FIG. 4, the mobile device 120 may adjust an initial value of the value or brightness component of the red text color 308. To determine whether to adjust the initial value by initially increasing or decreasing the initial value, the mobile device 120 may compare a lightness of the red text color 308 to the lightness of the blended background text color 306. If the red text color 308 is lighter than the blended background text color 306, the mobile device 120 may first increase the initial value of the value component, whereas if the red text color 308 is darker than the blended background text color 306, the mobile device 120 may first decrease the initial value of the value component. In the illustrated embodiment, the mobile device 120 may determine that the red text color 308 is darker than the blended background text color 306, and may begin incrementally decreasing the initial value of the value component of the red text color 308.

For example, in FIG. 4, at a first iteration 310, the mobile device 120 may darken the original red text color 308 to form a first iteration text color 312 by decreasing the value of the value component of the original red text color 308. The mobile device 120 may determine that the second threshold contrast ratio is not satisfied, and may again, at second iteration 320, decrease the value component of the original red text color 308 to form second iteration text color 314. The mobile device 120 may determine that the second threshold contrast ratio is not satisfied and may again, at third iteration 330, decrease the value component of the original red text color 308 to form third iteration text color 316. The mobile device 120 may determine that the second threshold contrast ratio is satisfied by the third iteration text color 316. The user 300 may not see any of the iterations of the modified text color other than the final modified text color that is displayed on the mobile device 120. In other words, some or all of the process 200 may be imperceptible to the user 300.

Figure 5:
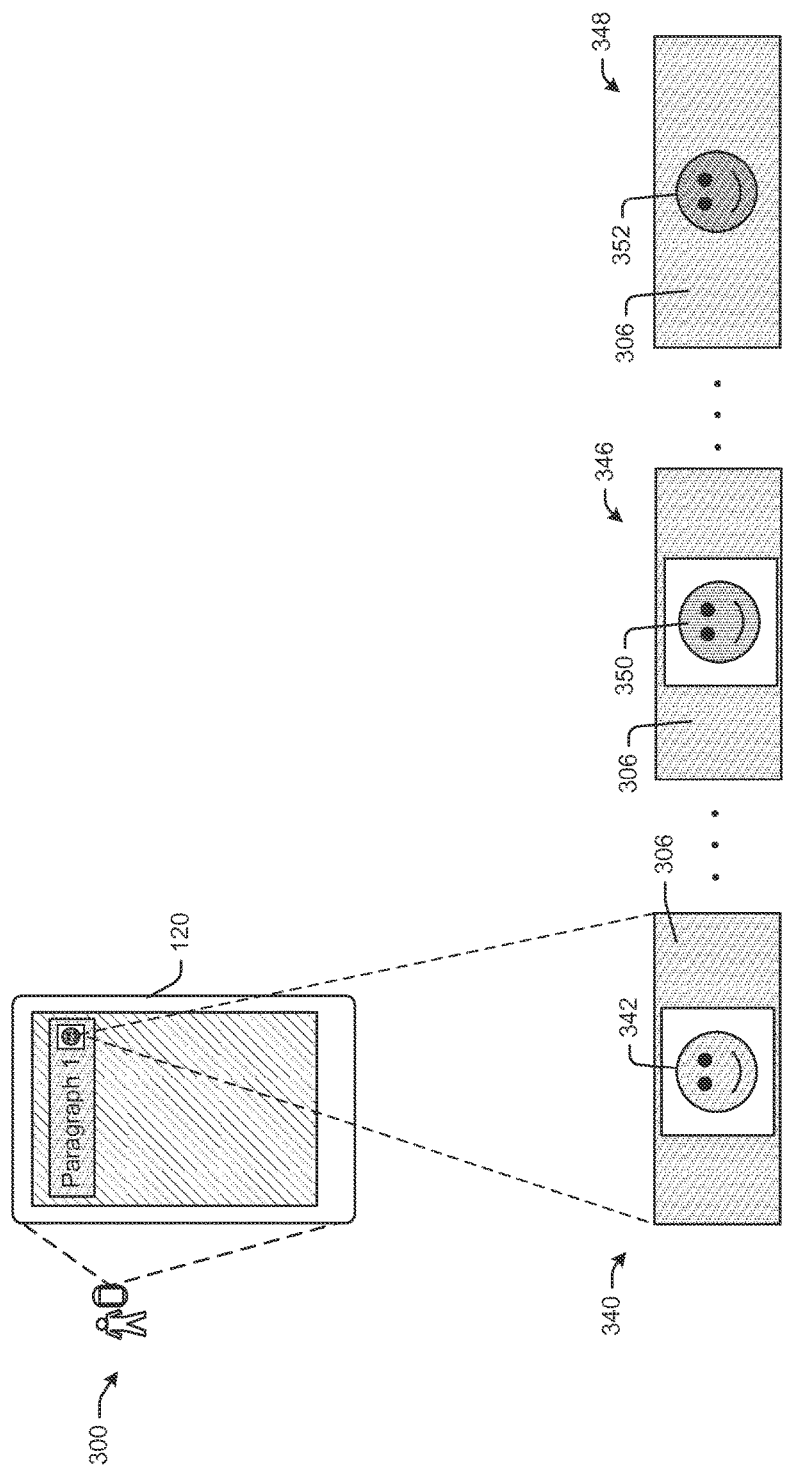

Referring to FIG. 5, the mobile device 120 may perform a similar process in determining a blended color to present for images, such as smiley line art image 342. For example, in a default mode 340, the original line art image 342 may be purple set against a white background 344. The mobile device 120 may determine, in a different operation mode such as night mode 346, that the white background 344 should be switched to the blended text background color 306. The mobile device 120 may determine whether the second threshold contrast ratio is satisfied. If not, the mobile device 120 may adjust a brightness of the initial color of the line art image 342, such that the second threshold contrast ratio is satisfied. For example, the mobile device 120 may incrementally increase the brightness of the line art image 342, as shown at a first iteration 346, until the second threshold contrast ratio is satisfied in the night mode 348 with line art image color 350.

Turning back to FIG. 2, at block 220, the mobile device 120 may convert the adjusted text color from HSV color space to RGB color space. At block 222 of the process 200, the mobile device 120 may display the portion of the electronic book on the electronic reader device with the theme background color, the blended text background color, and the adjusted text color. In FIG. 4, the mobile device 120 may display, for example, the theme background color 304, the blended text background color 306, and the modified text color 316 (the third iteration text color).

Electronic content may be highlighted by users. In some embodiments of the disclosure, the highlight color, as well as color of the highlighted text, may be adjusted depending on the operational mode of the mobile device. For example, a yellow highlight color may not provide the desired visual effect in sepia operational mode. Highlighted ranges, or electronic content highlighted by users, may include a highlight background color and/or a highlight text color. Accordingly, a stack of colors to compose together on a rendered page may include a highlighted text color, a highlight background color, an author or publisher selected or designated text color, an author or publisher selected or designated text background color, and a media or page color such as a default color from a color theme, for example a sepia operations mode. In some embodiments, the methods and systems described herein may be performed during interactive text selection by a user. Such instances may be similar to a highlighting process with an active selection text color and an active text selection background color. For example, rendered content may have a white page background and black text. During interactive text selection of text of the rendered content, the selected text may have an active selection text color of white and an active selection background color of blue. Unselected text may remain at the default or initial color settings. In an instance where a user selects text over an existing highlight, some embodiments may extend the active selection text and background colors, while other embodiments may compose the active selection colors together with the existing highlight, such that the existing highlighted and unhighlighted ranges are visible within the actively selected portion of text. Accordingly, during interactive selection of text by a user, the following colors may be considered or composed for potential rendering: a selected text color, a selected text background color, a highlighted text color, a highlighted text background color, an author or publisher text color, an author or publisher background color, and a default media or page background color associated with a color theme in effect at rendering.

The process 200 may be performed at run time. In instances where the background color of the electronic content is white, content may be delivered to the content rendering module where no further calculations or other transformation of data is needed before presentation. For example, with a default (e.g., white) background, there may be no additional determinations when switching into a different color mode. The first text color can be modified according to the background color of the selected operational mode, which may reduce processing time, and the content rendering module may be executed at run time.

In some embodiments, the mobile device 120 may determine if the background color of the portion of the eBook to be presented, or in some instances the eBook generally, has a white background. If so, the white background may be removed from the conversion process when switching operational modes, thereby reducing processing time. If, for example, the eBook has a layered black background with a white background on top, such that a black border is formed, then that background may be maintained at conversion before runtime. Based on what occurs at runtime and during the conversation process, calculations of text color may differ, as well as resultant processing time. Similar adjustments can be made with default (e.g., black) text colors.

Figure 6:
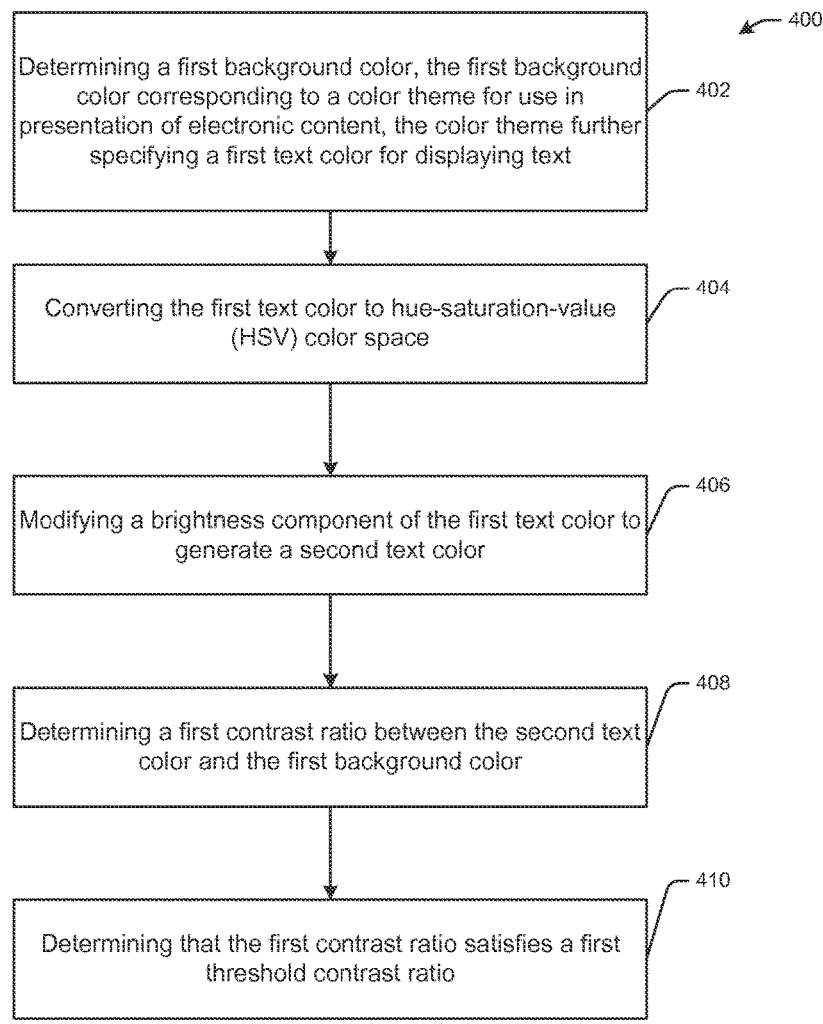
FIG. 6 is an illustrative method for dynamic color adjustment of electronic content in accordance with one or more example embodiments of the disclosure.

Referring to FIG. 6, an example method 400 for dynamic color adjustment for electronic content is provided. In some forms of electronic content, there may be no text background color and/or no specified background color. In such cases, text may be on top of a default background. The method 400 may be performed to adjust colors used in these embodiments.

At block 402, the method 400 may include identifying, by a computer system comprising one or more computer processors, a text background color for a user selected color theme associated with presentation of electronic content. At block 404, the method 400 may include converting, by the computer system, an initial text color for the user selected color theme to hue-saturation-value (HSV) color space. At block 406, the method 400 may include modifying, by the computer system, a brightness component of the initial text color to generate a modified text color. At block 408, the method 400 may include determining, by the computer system, a first contrast ratio between the modified text color and the text background color. At block 410, the method 400 may include determining, by the computer system, that the first contrast ratio satisfies a first threshold contrast ratio.

It should be noted, that the process 200 and the method 400 may be modified in various ways in accordance with certain embodiments of the disclosure. For example, one or more operations of process 200 and/or the method 400 may be eliminated or executed out of order in other embodiments of the disclosure. Additionally, other operations may be added to process 200 and/or the method 400 in accordance with other embodiments of the disclosure.

The above described example color blending determinations are merely examples and the implementations of the techniques disclosed herein are not so limited. As would be understood by one of ordinary skill in the art in view of this disclosure, any number of variations or alternative determination may be used without departing from the scope of this disclosure.

Illustrative Device Architecture

Figure 7:
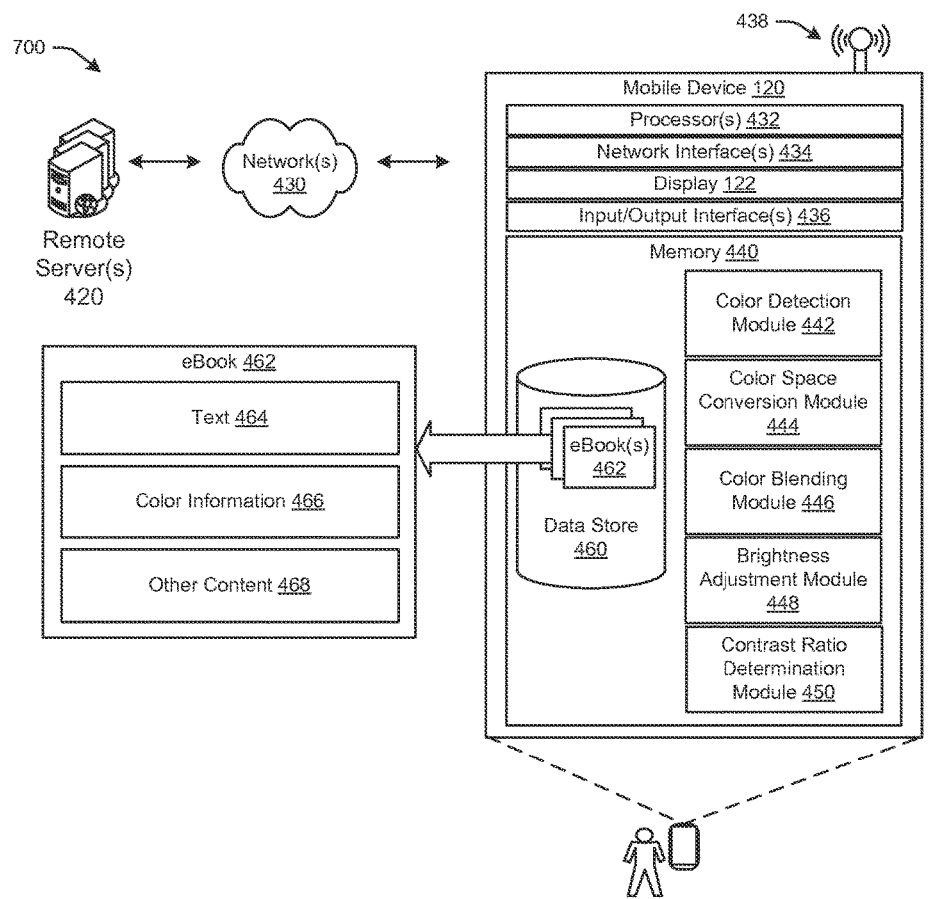
FIG. 7 is a schematic illustration of an example electronic device operating in an example network environment in accordance with one or more embodiments of the disclosure.

FIG. 7 is a schematic illustration of the example mobile device 120 of FIG. 1 operating in an example network environment 700 in accordance with one or more example embodiments of the disclosure. The device 120 may be any suitable user device including, but not limited to, a mobile device such as a smartphone, tablet, e-reader, or the like; a desktop computer; a laptop computer, a game console, a personal media player, a wearable computer device, and so forth. The device 120 may render electronic content in the different colors. The device 120 may be configured to operate in various operational modes and may be configured to adjust original or default colors for electronic content to correspond to the various operational modes of the mobile device 120.

The mobile device 120 may include, without limitation, smartphone devices, tablet devices, electronic reader devices ("e-readers"), wearable devices, or the like. In some instances, the mobile device 120 may retrieve one or more eBooks from one or more remote servers 420 via one or more network(s) 430. Upon accessing the eBook, a portion of the eBook content may be rendered or presented on the display 122 of the device 120. The device 120 may provide a capability (e.g., a pagination capability) to transition through the eBook such that additional portions of the eBook content are rendered on the display 122. This capability may be provided responsive to actuation of physical buttons of the device 120, responsive to a touch or other gesture applied to a touch-sensitive display of the device 120, responsive to a voice command, or the like.

The mobile device 120 may interact with the one or more network(s) 430 in the environment 700 to obtain electronic content or eBooks, such as those described above. The network(s) 430 generally refer to a network accessible platform implemented as a computing infrastructure that may include processors, storage, software, and so forth that is maintained and accessible via the Internet, for example. The network(s) 430 may not require end-user knowledge of the physical location and configuration of the system that delivers the services. Common expressions associated with cloud services that may be provided via the network(s) 430 include "on-demand computing", "software as a service (SaaS)", "platform computing", "network accessible platform", and so forth.

In this implementation, the device 120 may be configured with one or more remote device interaction modules and/or one or more local modules that may make requests for eBooks from one or more remote server(s) 420, for example. The server(s) 420 may include one or more processors, memory, and network interfaces. The server(s) 420 may function jointly as part of a system that provides processing and memory in part on the device 120 and in part on the network(s) 430. The server(s) 420 may be arranged in any number of ways, such as in server farms, stacks, or the like and may be housed in one or more data centers.

The eBook includes a plurality of words or text presented to consumers. The text may be associated with individual portions of the eBook, which may correspond to pages of printed versions of the eBook. In the illustrated embodiments, the eBook is presented in English. It is understood that the example embodiments described herein may be applicable to any language. One or more words of the text presented to the consumers may be associated with colors selected by the author or publisher of the eBook, for example. The colors may convey information to the consumer of the eBook or electronic content.

As illustrated, the device 120 includes one or more processor(s) 432, one or more network interface(s) 434, one or more displays 122, one or more input/output ("I/O") interface(s) 436, one or more antenna(s) 438, and one or more memory devices 440. The device 120 may also include various additional components, such as one or more input device(s), configured to interact with the I/O interface 436, that allow the user 102 to operate the device 120. The device 120 may also include an operating system configured to provide an interface between software and hardware resources of the device 120, and/or database management systems configured to support functionality of the memory 440. The device 120 may include system busses that functionally couple various components of the device 120. In other embodiments, the device 120 may include additional or fewer components.

The processor(s) 432 may be configured to access the memory 440 and execute computer-executable instructions loaded therein. For example, the processor(s) 432 may be configured to execute computer-executable instructions of the various program modules of the device 120 to cause or facilitate various operations to be performed in accordance with one or more embodiments of the disclosure. The processor(s) 432 may include any suitable processing unit capable of accepting data as input, processing the input data in accordance with stored computer-executable instructions, and generating output data. The processor(s) 432 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 432 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 432 may be capable of supporting any of a variety of instruction sets.

The network interface(s) 434 may be configured to allow the device 120 to communicate with content providers and other entities over networks (e.g., network(s) 430), such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The display 122 may comprise any sort of display for visually rendering electronic books, such as a liquid crystal display (LCD), a light-emitting diode (LED) display, an electronic paper display, or the like. The display 122 may further comprise an input device such as a touchscreen.

One or more input/output (I/O) interface(s) 436 may be provided that may facilitate the receipt of input information by the device 120 from one or more I/O devices as well as the output of information from the device 120 to the one or more I/O devices. The I/O devices may include, for example, one or more user interface devices that facilitate interaction between a user and the device 120 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The antenna(s) 438 may include any suitable type of antenna(s) depending, for example, on the communications protocols used to transmit or receive signals via the antenna(s) 438. Non-limiting examples of suitable antennas may include directional antennas, non-directional antennas, dipole antennas, folded dipole antennas, patch antennas, multiple-input multiple-output (MIMO) antennas, or the like. The antenna(s) 438 may be communicatively coupled to one or more transceivers or radio components to which or from which signals may be transmitted or received. The antenna(s) 438 of the device 120 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas can include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The antenna(s) 438 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 438 may be configured to transmit or receive radio frequency signals within any suitable frequency range forming part of the unlicensed portion of the radio spectrum.

The device 120 may include a transceiver with any suitable radio component(s) for, in cooperation with the antenna(s) 438, transmitting or receiving radio frequency (RF) signals in the bandwidth and/or channels corresponding to the communications protocols utilized by the device 120 to communicate with other devices. The transceiver may include hardware, software, and/or firmware for modulating, transmitting, or receiving, potentially in cooperation with any of antenna(s) 438, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver may include any known receiver and baseband suitable for communicating via the communications protocols utilized by the device 120.

The memory 440 may include one or more program modules, applications, or the like, such as a color detection module 442, a color space conversion module 444, a color blending module 446, a brightness adjustment module 448, and a contrast ratio determination module 450. Any of the modules may include one or more sub-modules. For example, the color space conversion module 444 may include an RGB color space conversion sub-module and an HSV color space conversion sub-module. Any of the modules depicted in FIG. 7 may include computer-executable code, instructions, or the like that may be loaded into the memory 440 for execution by one or more of the processor(s) 432. Further, any data may be loaded into the memory 440 for use by the processor(s) 432 in executing computer-executable code. For example, an eBook may be loaded from the memory 440 to facilitate rendering of the eBook by the one or more of the processor(s) 432.

The memory 440 of the device 120 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 440 may include removable and/or non-removable media which may be implemented in any method or technology for storage of information, such as computer-readable instructions, data structures, program modules, or other data.

In various implementations, the memory 440 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 440 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

The mobile device 120 may include any number of data stores that may provide non-volatile storage of computer-executable instructions and other data. The memory 440 and the data store, removable and/or non-removable, are examples of computer-readable storage media (CRSM) as that term is used herein. Data stores may store computer-executable code, instructions, or the like that may be loadable into the memory 440 and executable by the processor(s) 432 to cause the processor(s) 432 to perform or initiate various operations. Data stores may additionally store data that may be copied to memory 440 for use by the processor(s) 432 during the execution of the computer-executable instructions. Moreover, output data generated as a result of execution of the computer-executable instructions by the processor(s) 432 may be stored initially in memory 440, and may ultimately be copied to a data store for non-volatile storage.

Data stores may store user data and electronic content, such as one or more eBook(s). Data stores may store eBooks persistently or temporarily, as in the case where a content provider streams delivery of an eBook being rendered the device 120. In either instance, FIG. 7 illustrates an example data store 460 having an eBook 462 stored thereon. The eBook 462 includes text 464, color information 466, and other content 468 of the eBook (e.g., images, videos, etc.).

The text 464 may comprise any combination of phonographic characters (e.g., English words, etc.), logographic characters (e.g., Kanji or Gaiji characters, etc.) and/or any other type of character that forms the words of the eBook 462. Furthermore, some or all of the words formed of these characters may correspond to respective color information 466. In some implementations, the color information 466 may comprise specific colors indicated by color code values that may include hue values, saturation values, and/or value values and may be chosen to convey certain information or aesthetics to a consumer. In some instances, the color information 466 may comprise content that is configured to be output visually on the display 122, while in other instances the color information 466 may comprise content that is configured to be output audibly on one or more speakers of the device 120. For example, in some implementations, the color information 466 may include audio descriptions of color that are recorded or synthesized spoken versions of one or more corresponding colors for specific portions of the text.

Referring now to functionality supported by the various program modules depicted in FIG. 7, the color detection module 442 may include computer-executable instructions, code, or the like, that, responsive to execution by the processor(s) 432, may cause the mobile device 120 to identify a text background color for a user selected color theme associated with presentation of electronic content. In some instances, the color detection module 442 may identify a publisher selected text background color for a portion of an electronic book to be displayed on the electronic reader device. In some embodiments, computer-executable instructions of the color detection module 442 may be executed to compare the text background color code value to the theme background color code value. Computer-executable instructions of the color detection module 442 may be executed to identify an initial text color for the portion of the electronic book to be displayed on the device, the initial text color having an initial text color code value indicative of the initial text color.

The color space conversion module 444 may include computer-executable instructions, code, or the like, that, responsive to execution by the processor(s) 432, may cause the mobile device 120 to convert color information, such as the color information 466 included with the eBook 462, from a first color space to a second color space. In one example, the color space conversion module 444 may convert an initial text color from red-green-blue (RGB) color space to hue-saturation-value (HSV) color space including a hue component, a saturation component, and a value component. In some embodiments, computer-executable instructions of the color space conversion module 444 may be executed to convert an adjusted text color from HSV color space to RGB color space.

The color blending module 446 may include computer-executable instructions, code, or the like, that, responsive to execution by the processor(s) 432, may cause the mobile device 120 to identify a translucency value of the text background color based on the text background color code value. In some embodiments, computer-executable instructions of the color space conversion module 444 may be executed to generate a blended text background color with a blended text background color code value indicative of the blended text background color.

The brightness adjustment module 448 may include computer-executable instructions, code, or the like, that, responsive to execution by the processor(s) 432, may cause the mobile device 120 to modify a brightness component of the initial text color to generate a modified text color. In some embodiments, computer-executable instructions of the may be executed to adjust an initial value of the value component of the initial text color to generate an adjusted text color, such that a second contrast ratio between the adjusted text color and the blended text background color satisfies a second threshold contrast ratio.

The contrast ratio determination module 450 may include computer-executable instructions, code, or the like, that, responsive to execution by the processor(s) 432, may cause the mobile device 120 to calculate a first contrast ratio between the blended text background color and the theme background color. In some embodiments, computer-executable instructions of the contrast ratio determination module 450 may be executed to determine that the first contrast ratio satisfies a first threshold contrast ratio between a text background color and a background color. In some embodiments, computer-executable instructions of the contrast ratio determination module 450 may be executed to determine that the second contrast ratio satisfies a second threshold contrast ratio between a text color and a text background color.

While FIG. 7 illustrates one example device, it is to be appreciated that multiple other devices and architectures may implement the described techniques. For instance, the components illustrated as being located on or accessible to the device 120 may be located in any other location, such as on one or more of servers that are accessible to the device over a network, spread out amongst servers, located on other user devices, and/or the like.

It should further be appreciated that the device 120 may include alternate and/or additional hardware, software, or firmware components beyond those described or depicted without departing from the scope of the disclosure. More particularly, it should be appreciated that software, firmware, or hardware components depicted as forming part of the device 120 are merely illustrative and that some components may not be present or additional components may be provided in various embodiments. While various illustrative program modules have been depicted and described as software or data stored in the data store 462, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   determining, by a computer system comprising one or more computer processors, a first background color corresponding to a color theme for use in presentation of electronic content, the color theme specifying a first text color for displaying text;
   converting, by the computer system, the first text color to hue-saturation-value (HSV) color space;
   increasing, by the computer system, a brightness component of the first text color to generate a second text color;
   determining that the brightness component has been increased to a maximum value;
   determining that a first contrast ratio between the second text color and the first background color does not satisfy a first threshold contrast ratio;
   automatically decreasing the brightness component until the first threshold contrast ratio is satisfied;
   determining a third text color with the brightness component that satisfies the first threshold contrast ratio;
   identifying a second background color that corresponds to the color theme, wherein the second background color is different than the first background color;
   generating a third background color that is a blend of the first background color and the second background color;
   determining that a second contrast ratio between the third text color and the third background color satisfies a second threshold contrast ratio; and
   displaying, by the computer system, the electronic content using the third background color, the electronic content including text having the third text color.

2. The method of claim 1, further comprising:
   prior to displaying the electronic content, converting, by the computer system, the third text color to red-green-blue (RGB) color space.

3. The method of claim 1, wherein:
   the HSV color space comprises a hue component with an initial hue value, a saturation component with an initial saturation value, and a brightness component with an initial brightness value; and
   the second text color comprises the initial hue value and the initial saturation value.

4. The method of claim 1, wherein the first threshold contrast ratio is 4.5:1.

5. The method of claim 1, wherein the third background color is a weighted average of the first background color and the second background color, wherein the first background color is weighted based on a first translucency value of the first background color and the second background color is weighted based on a second translucency of the second background color.

6. The method of claim 1, wherein the second threshold contrast ratio is 2:1.

7. The method of claim 1, wherein further comprising:
   determining that the first text color is lighter than the first background color; and
   increasing the brightness component of the first text color by a predetermined value.

8. The method of claim 1, further comprising:
   determining that the third text color is darker than the second background color; and
   decreasing the brightness component of the third text color by a predetermined value.

9. The method of claim 1, wherein automatically decreasing the brightness component until the first threshold contrast ratio is satisfied comprises decreasing the brightness component until a minimum value is reached.

10. A computer device comprising:
    at least one memory that stores computer-executable instructions; and
    at least one processor configured to access the at least one memory and execute the computer-executable instructions to:
    determine a first background color, the first background color corresponding to a color theme for use in presentation of electronic content, the color theme further specifying a first text color for displaying text;
    convert the first text color to hue-saturation-value (HSV) color space;
    modify a brightness component of the first text color to generate a second text color;
    blend the first background color with a second background color to generate a third background color;
    determine a first contrast ratio between the second text color and the third background color;
    determine that the first contrast ratio satisfies a first threshold contrast ratio;
    determine that a second contrast ratio between the third background color and the second background color satisfies a second threshold contrast ratio; and display the electronic content using the first background color, the electronic content including text having the second text color.

11. The computer device of claim 10, wherein the at least one processor is further configured to execute the computer-executable instructions to:
prior to displaying the electronic content, convert the second text color to red-green-blue (RGB) color space.

12. The computer device of claim 10, wherein:
the HSV color space comprises a hue component with an initial hue value, a saturation component with an initial saturation value, and a brightness component with an initial brightness value; and
the second text color comprises the initial hue value, the initial saturation value, and a modified brightness value.

13. The computer device of claim 10, wherein the at least one processor is further configured to execute the computer-executable instructions to:
identify the second background color, the second background color corresponding to the color theme; and
determine that the second background color is different than the first background color.

14. The computer device of claim 10, wherein the at least one processor is configured to modify the brightness component of the first text color to generate the second text color by executing the computer-executable instructions to:
determine that the first text color is lighter than the first background color; and
increase the brightness component of the first text color by a predetermined value to satisfy the first threshold contrast ratio.

15. The computer device of claim 10, wherein the at least one processor is configured to modify the brightness component of the first text color to generate the second text color by executing the computer-executable instructions to:
determine that the first text color is darker than the first background color; and
decrease the brightness component of the first text color by a predetermined value to satisfy the first threshold contrast ratio.

16. A device comprising:
at least one memory that stores computer-executable instructions; and
at least one processor configured to access the at least one memory and execute the computer-executable instructions to:
determine a first background color, the first background color corresponding to a color theme for use in presentation of electronic content, the color theme further specifying a first text color for displaying text;
identify a second background color that is different than the first background color, the second background color corresponding to the color theme;
blend the first background color with the second background color to generate a third background color;
determine that a first contrast ratio between the third background color and the second background color satisfies a first threshold contrast ratio;
convert the first text color to hue-saturation-value (HSV) color space;
increase a brightness component of the first text color to generate a second text color;
determine that the brightness component has been increased to a maximum value;
determine that a second contrast ratio between the second text color and the third background color is not satisfied;
decrease the brightness component until the second threshold contrast ratio is satisfied;
determine a third text color with the brightness component that satisfies the second threshold contrast ratio; and
cause display of the electronic content using the third background color, the electronic content including text having the third text color.

17. The device of claim 16, wherein the at least one processor is further configured to execute the computer-executable instructions to:
determine that the first text color is lighter than the third background color.

18. The device of claim 16, wherein the at least one processor is further configured to execute the computer-executable instructions to:
determine that the third text color is darker than the second background color; and
decrease the brightness component of the third text color by a predetermined value.

19. The device of claim 16, wherein the second contrast ratio is determined by dividing a first calculated relative luminance of the third background color by a second calculated relative luminance of the second text color.

* * * * *